(12) United States Patent
Nakagoe

(10) Patent No.: US 10,635,689 B2
(45) Date of Patent: Apr. 28, 2020

(54) SYSTEM AND METHOD OF ORCHESTRATION WITH DATA INTEGRATION

(71) Applicant: Hitachi, Ltd., Chiyoda-ku, Tokyo (JP)

(72) Inventor: Hiroshi Nakagoe, Los Gatos, CA (US)

(73) Assignee: HITACHI, LTD., Tokyo (JP)

( * ) Notice: Subject to any disclaimer, the term of this patent is extended or adjusted under 35 U.S.C. 154(b) by 307 days.

(21) Appl. No.: 15/801,129

(22) Filed: Nov. 1, 2017

(65) Prior Publication Data

US 2019/0130008 A1    May 2, 2019

(51) Int. Cl.
  *G06F 16/25*  (2019.01)
  *G06F 16/21*  (2019.01)
  *G06F 8/60*   (2018.01)
  *H04L 29/08*  (2006.01)

(52) U.S. Cl.
  CPC .......... *G06F 16/254* (2019.01); *G06F 8/60* (2013.01); *G06F 16/211* (2019.01); *H04L 67/10* (2013.01)

(58) Field of Classification Search
  CPC ........ G06F 16/254; G06F 8/60; G06F 16/211; H04L 67/10
  USPC .................................................. 707/602, 803
  See application file for complete search history.

(56) References Cited

U.S. PATENT DOCUMENTS

| 8,433,673 | B2 * | 4/2013 | Venkatasubramanian ................... G06F 16/254 707/602 |
| 9,052,961 | B2 * | 6/2015 | Mangtani ............... G06F 9/5072 |
| 9,286,329 | B2 * | 3/2016 | Svarovsky ............ G06F 16/242 |
| 2011/0295794 | A1 * | 12/2011 | Venkatasubramanian ................... G06F 16/254 707/E17.005 |
| 2013/0232498 | A1 * | 9/2013 | Mangtani ............... G06F 9/5072 718/104 |
| 2015/0220572 | A1 * | 8/2015 | Svarovsky ............ G06F 16/242 707/603 |
| 2019/0130007 | A1 * | 5/2019 | Hao ........................ G06F 11/36 |

* cited by examiner

*Primary Examiner* — Phong H Nguyen
(74) *Attorney, Agent, or Firm* — Procopio, Cory, Hargreaves & Savitch LLP

(57) ABSTRACT

Example implementations are directed to a system and method to reduce deployment cost of data analytics application by designing both an application deployment plan and data integration plan, implementing the plans into an application template automatically and deploying application components and data in accordance with the desired implementation. Through example implementations, the need for separate terminals for a data engineer and an application engineer can be eliminated.

15 Claims, 13 Drawing Sheets

| input | filter |
|---|---|
| group A (source: csv files) | filter {<br>csv {<br>  columns =>["latitude", "longitude", "value_a", "value_b", "timestamp"]<br>  separator => ";"<br>},<br>mutate {<br>rename => {"latitude" => "[properties][latitude]", "longitude" => "[properties][longitude]", "value_a=> "[properties][value_a]", "value_b" => "[properties][value_b]", "timestamp" => "[properties][timestamp]"}<br>},<br>rcount: NUM_OF_ROW_COUNT,<br>ccount: NUM_OF_COLUMN_COUNT<br>} |
| group B (source: json files) | filter {<br>// copy source data<br>rcount: NUM_OF_ROW_COUNT,<br>ccount: NUM_OF_COLUMN_COUNT<br>} |
| group C (source: xml files) | filter {<br>xml {<br>  xpath => ["/msg/@latitude", "latitude", "/msg/@longitude", "longitude", "/msg/@value_a", "value_a", "/msg/@value_b", "value_b", "/msg/@timestamp", "timestamp"]<br>}<br>rcount: NUM_OF_ROW_COUNT,<br>ccount: NUM_OF_COLUMN_COUNT} |
| group D (source: text files) | filter {<br>grok { match => {"message" =>"%{COMBINEDAPACHELOG}"} },<br>rcount: NUM_OF_ROW_COUNT,<br>ccount: NUM_OF_COLUMN_COUNT<br>} |

| use case | metadata of source data | data extraction type | DB | data Schema |
|---|---|---|---|---|
| visualization (graph) | D/C | short range | Key-Value in-memory DB | key: metadata.key<br>value: source_data.value |
| | complicated data structure | long range | Document DB | key: metadata.key<br>value: source_data.value |
| | small data set | long range | Key-Value in-memory DB | key: metadata.key<br>value: source_data.value |
| | large data set | long range | Column-based DB | column.family.key: metadata.key<br>column.namae: metadata.key<br>column.value: source_data.value |
| visualization (report) | D/C | short range | Key-Value in-memory DB | key: metadata.key<br>value: source_data.value |
| | D/C | long range | RDB | name: metadata.key<br>value: source_data.value |
| Aggregation | D/C | short range | Key-Value in-memory DB | key: metadata.key<br>value: source_data.value |
| | complicated data structure | long range | Document DB | key: metadata.key<br>value: source_data.value |
| | small data set | long range | Key-Value in-memory DB | key: metadata.key<br>value: source_data.value |
| | large data set | long range | Column-based DB | column.family.key: metadata.key<br>column.namae: metadata.key<br>column.value: source_data.value |
| Search (any query) | D/C | D/C | RDB | name: metadata.key<br>value: source_data.value |

FIG. 5

| application name | application template |
|---|---|
| analytics application | services:<br>  analytics:<br>    container_name: analytics_application<br>    depends_on:<br>    -{{*for=db in dbs}}<br>  {{*for=db of dbs}}:<br>    image: {{db.image}}<br>    volumes:<br>      -{{db.path}} |
| ... | ... |

FIG. 6

| application name | application configuration file | code |
|---|---|---|
| analytics application A | {<br>"name": "application name",<br>"version": "x.x.x",<br>"license": "any",<br>"supportedDB": ["DB A": "^x.x.x", "DB B": "latest"]<br>} | ... |
| analytics application B | {<br>"name": "application name",<br>"version": "y.y.y",<br>"license": "any",<br>"supportedDB": ["DB A": "^z.z.z"]<br>} | ... |

SYSTEM AND METHOD OF ORCHESTRATION WITH DATA INTEGRATION

BACKGROUND

Field

The present disclosure relates generally to data analytics, and more specifically, to systems and methods of orchestration with data integration.

Related Art

In the related art, many applications are based on micro services. Such an application involves many micro services so that users get involved in a tough deployment of application components.

Currently, the related art involves many tools to deploy application components automatically. An example related art implementation involves designing a blueprint which has a logical topology of virtual computing resources and application components, generating deployment plans based on the blueprint, and deploying application components according to the deployment plan. Therefore, once the users create an application template, the users can deploy their application without any operations. Such related art implementations allow the users to avoid a tough deployment.

In another related art implementation, application components can be deployed and some virtual computing resources in which the application will be installed, even if users are able to select each of application components properly. For instance, when users want to deploy MEAN (MongoDB, ExpressJs, AngularJS and NodeJS) stack, users can select such components relatively easily, as the MEAN stack is just one form of web application. However, users do not have such standard components for data analytics. When users want to visualize some structured data as a list, users utilize a visualization application and Relational Data Base (RDB), because RDB manages data within tables as similar to above "list" and is able to read rows with high performance. In another case, when users want to aggregate some columns of data, users utilize an aggregation application and column-based data base, because the column-based data base manages data as a group of columns and is able to read columns with high performance. Furthermore, when users want to detect abnormal values out of time-series data, users should use key-value in-memory data store which can read stream data with high performance. Thus, users have to select data stores in terms of how to use data and what kinds of data to be used. When there are N types of data and M types of data stores, users should select out of N*M sets.

Generally, the users who want to deploy the data analytics application might be data scientists, and they might not have enough knowledge regarding data store. Thus, it can be difficult for users to create their own application templates. In related art implementations, the data scientists select existing application templates created by data engineers or infrastructure engineers out of application catalog as shown in FIG. 8. However, such related art implementations are difficult because the data scientists have to select an adequate template out of many existing application templates, which is not a feasible solution for data scientists.

Furthermore, related art implementations do not provide any implementations regarding deploying data into the data store. Thus, users have to export data from data sources, transform data and load data into data store. The data scientists may not have any knowledge of what data store is adequate for their analytics case.

SUMMARY

Example implementations described herein can involve a data flow orchestrater which creates a data integration plan and application logical topology according to a user data analytics plan. The user data analytics plan includes the types of data to be utilized, the types of algorithms to be utilized and the types of data analytics applications to be utilized. The data integration plan involves the selection of DBs and the design of data schema. The application deployment plan involves the design of a deployment plan of virtual resources and applications and implements the same as an application template. The plan executor executes deployment of application components according to the application template.

In the related art, the general flow involves having a data scientist creating a data analytics plan through his terminal. The data scientist then contacts the application engineer to create an application logical topology, and the data engineer to select databases and create data schemas. The data engineer and application engineer utilize the specialized software packages on their terminals to select the databases, create data schemas, and create application logical topology. Once complete, the application engineer generates the deployment plan on their terminal through their specialized software package. Thus, the related art requires at least three terminals (data scientist terminal, data engineer terminal, application engineer terminal) and multiple contacts between engineers to effect the deployment plan.

In the present disclosure, the data engineer terminal and the application engineer terminal, along with their specialized software packages, can be eliminated through an integrated system directed to the data scientist. In example implementations, the data scientist terminal can enact the same functionality without the specialized software packages, the data engineer terminal, or the application engineer terminal. This reduces the number of hardware and software packages needed to effect the deployment plan, while reducing the number of communications needed to effect the deployment plan as the data engineer can generate the deployment plan through their individual terminal only, instead of requiring a data engineer terminal and an application engineer terminal.

Aspects of the present disclosure can include a method for analytics deployment, which can include generating one or more data schemas for a data analytics plan and a selection of one or more databases; generating a logical topology of application components and an Extract, Transfer Load (ETL) plan; generating a deployment plan from the logical topology of application components and the ETL plan, the deployment plan including executable code for a deployment engine; and executing the executable code on the deployment engine to deploy the data analytics plan on a cloud computing platform. The executing the executable code on the deployment engine to deploy the data analytics plan on a cloud computing platform can include deploying application components according to the logical topology; generating connections between the application components according to the, and loading data to the selected one or more databases according to the generated one or more data schemas.

Aspects of the present disclosure can include a system for analytics deployment, which can include means for generating one or more data schemas for a data analytics plan and a selection of one or more databases; means for generating a logical topology of application components and an Extract, Transfer Load (ETL) plan; means for generating a deployment plan from the logical topology of application components and the ETL plan, the deployment plan including executable code for a deployment engine; and means for executing the executable code on the deployment engine to deploy the data analytics plan on a cloud computing platform. The means for executing the executable code on the deployment engine to deploy the data analytics plan on a cloud computing platform can include means for deploying application components according to the logical topology; means for generating connections between the application components according to the, and means for loading data to the selected one or more databases according to the generated one or more data schemas.

Aspects of the present disclosure can include a non-transitory computer readable medium, storing instructions for analytics deployment, the instructions which can include generating one or more data schemas for a data analytics plan and a selection of one or more databases; generating a logical topology of application components and an Extract, Transfer Load (ETL) plan; generating a deployment plan from the logical topology of application components and the ETL plan, the deployment plan including executable code for a deployment engine; and executing the executable code on the deployment engine to deploy the data analytics plan on a cloud computing platform. The executing the executable code on the deployment engine to deploy the data analytics plan on a cloud computing platform can include deploying application components according to the logical topology; generating connections between the application components according to the, and loading data to the selected one or more databases according to the generated one or more data schemas.

BRIEF DESCRIPTION OF DRAWINGS

FIG. 4 illustrates an example of filtering from metadata creator, in accordance with an example implementation.

FIG. 5 illustrates the example of a table representing the DB/data schema map of FIG. 2, in accordance with an example implementation.

FIG. 6 shows an example of application catalog, in accordance with an example implementation.

FIG. 7 illustrates an example of application repository, in accordance with an example implementation.

DETAILED DESCRIPTION

Figure 1A:
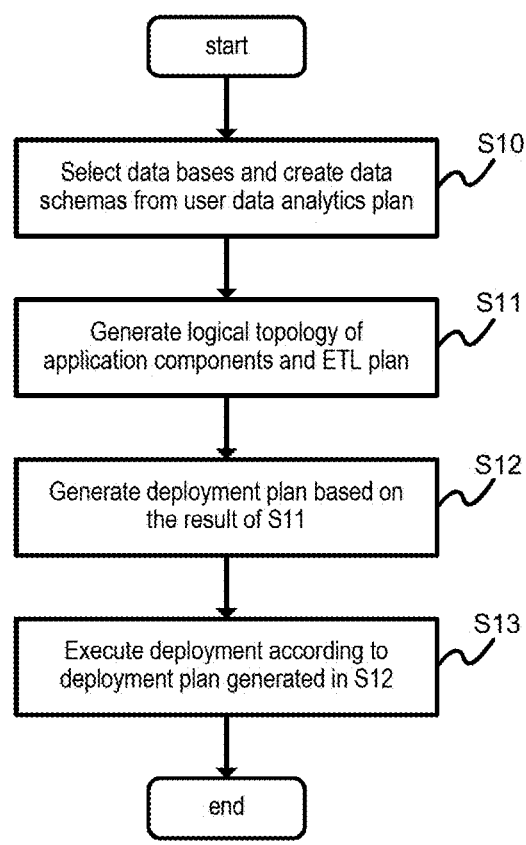
FIGS. 1(a) to 1(e) illustrate a procedural flow, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIGS. 1(a) to 1(e) illustrate example flows, in accordance with an example implementation. FIG. 1(a) illustrates a procedural flow, in accordance with an example implementation. In an example flow, the system selects databases (DBs) and creates data schemas from utilizing a user data analytics plan created by data scientists (S10). Then, the system generates a logical topology of application components and Extract, Transfer, Load (ETL) plan (S11). A logical topology can involve the set of application components and the connection between application components. ETL plan indicates how to extract data, where to extract from/to and how to transform data. Basically, the source data and the way of transformation can be indicated by users. Then, the system generates a deployment plan based on the result of S11 (S12). The result of S12 is an implementation of S11, which can be in the form of executable code to be used in a deployment engine. Lastly, the system executes to deploy application components, generate connections between application components and load data to DBs according to the deployment plan generated in S12 (S13).

Figure 1B:
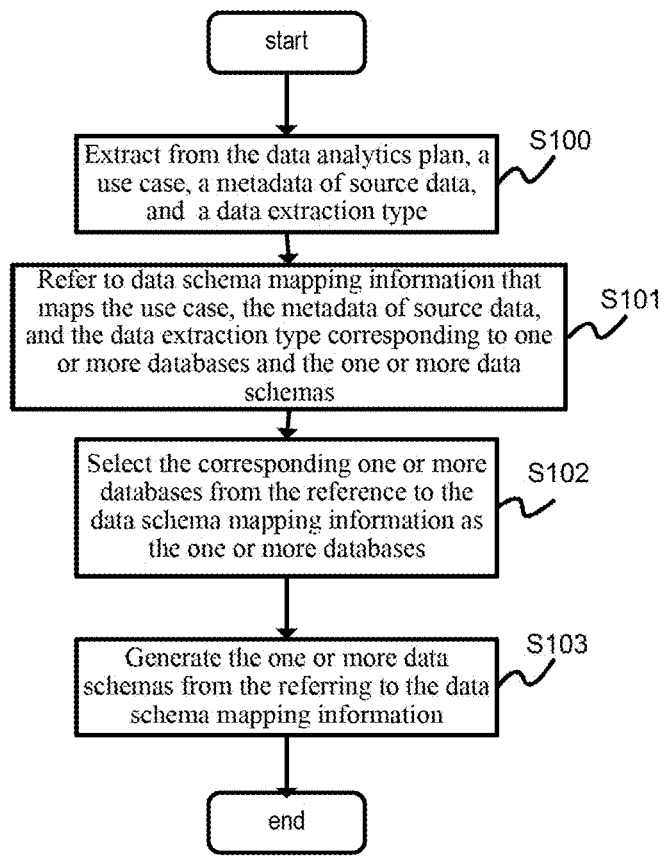

FIG. 1(b) illustrates an example flow for selecting databases and creating data schemas, in accordance with an example implementation. Specifically, FIG. 1(b) illustrates an example execution for S10 of FIG. 1(a). In an example flow, at S100 the system extracts from the data analytics plan, a use case, a metadata of source data, and a data extraction type as defined by the user terminal through the interface described in FIG. 3 as well as the metadata as determined at FIG. 4. At S101, the system refers to data schema mapping information that maps the use case, the metadata of source data, and the data extraction type corresponding to one or more databases and the one or more data schemas as illustrated in FIG. 5. At S102, the system selects the corresponding one or more databases from the reference to the data schema mapping information as the one or more databases based on extracting from the DB column of FIG. 5 the DBs that corresponds with the use case, the metadata of source data, and the data extraction type defined in the data analytics plan from S100. At S103, the system then generates the one or more data schemas from the referring to the data schema mapping information by loading the schemas corresponding to the use case, metadata of source type, and data extraction type defined in the data analytics plan from S100.

Figure 1C:
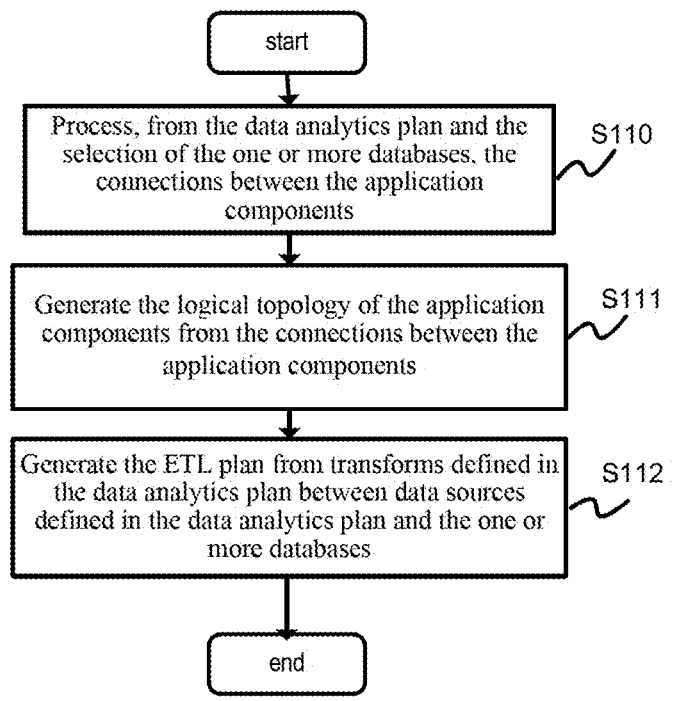

FIG. 1(c) illustrates an example flow for generating a logical topology of application components and an ETL plan in accordance with an example implementation. Specifically, FIG. 1(c) illustrates an example execution of S11 of FIG. 1(a). At S110, the system processes, from the data analytics plan and the selection of the one or more databases, the connections between the application components based on the databases determined from the flow of FIG. 1(b) as well as the links defined from the user terminal through the user interface of FIG. 3. At S111, the system generates the logical topology of the application components from the connections between the application components according to the links defined in the user interface of FIG. 3. At S112, the system generates the ETL plan from transforms defined in the data analytics plan between data sources defined in the data analytics plan and the one or more databases, as indicated by the transforms selected and the links defined through the user interface of FIG. 3.

Figure 1D:
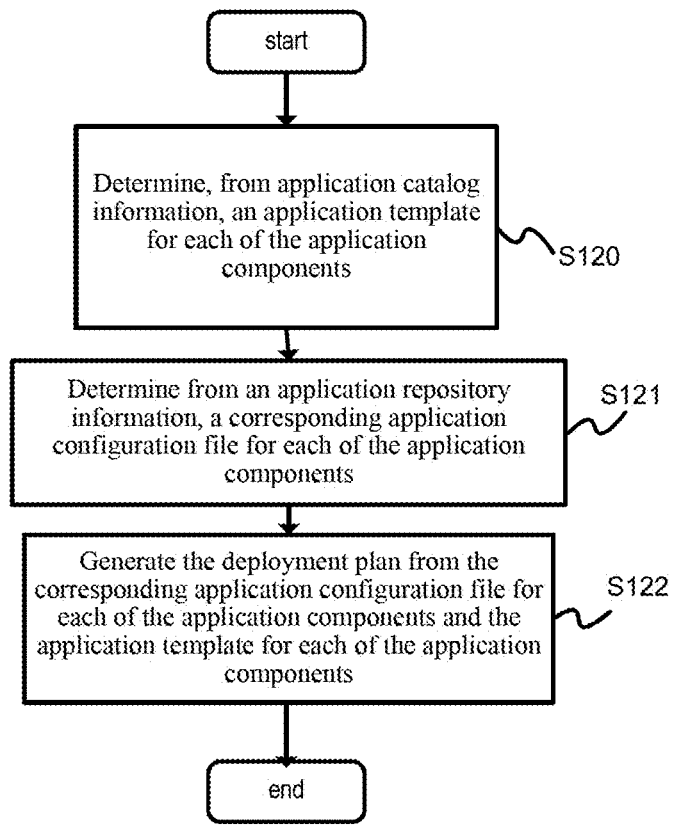

FIG. 1(d) illustrates an example flow for generating a deployment plan, in accordance with an example implementation. Specifically, FIG. 1(d) illustrates an example execution of S12 of FIG. 1(a). At S120, the system determines, from application catalog information as illustrated in FIG. 6, an application template for each of the application components defined from the data analytics plan from the user interface of FIG. 3. Such an application template may also involve a database template configured to assign a database for the deployment plan. At S121, the system determines, from an application repository information as illustrated in FIG. 7, a corresponding application configuration file for each of the application components defined in the user interface of FIG. 3. Each of the corresponding application configuration files may involve executable application code and metadata indicative of valid databases for the each of the application components as illustrated in FIG. 7. At S122, the system generates the deployment plan from the corresponding application configuration file for each of the application components and the application template for each of the application components through incorporation of the configuration files and templates determined from S120 and S121 into an executable deployment plan.

Figure 1E:
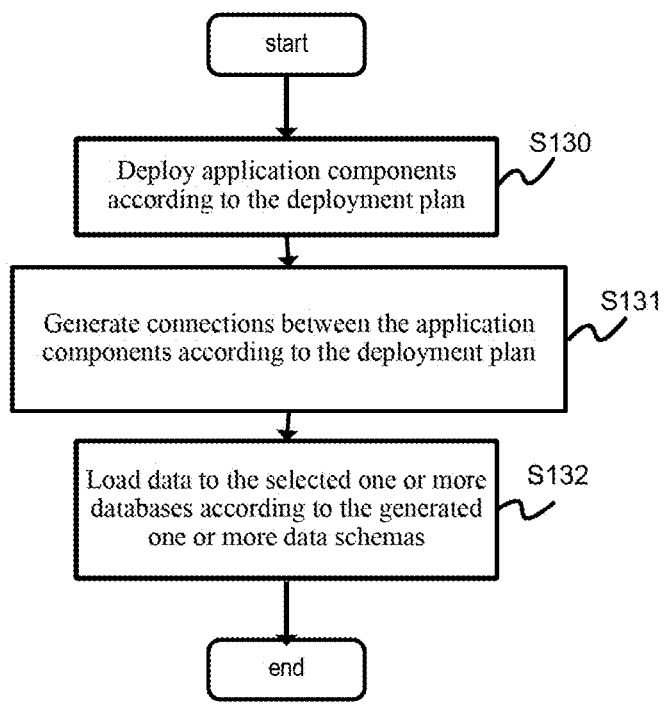

FIG. 1(e) illustrates an example flow for executing a deployment plan, in accordance with an example implementation. Specifically, FIG. 1(e) illustrates an example execution of the flow at S13 of FIG. 1(a). At S130, the system deploys application components according to the deployment plan as provided from FIGS. 1(b) to 1(d). At S131, the system generates connections between the application components according to the deployment plan as provided from FIGS. 1(b) to 1(d), and at S132, the system loads data to the selected one or more databases according to the generated one or more data schemas as provided from FIGS. 1(b) to 1(d).

Figure 2:
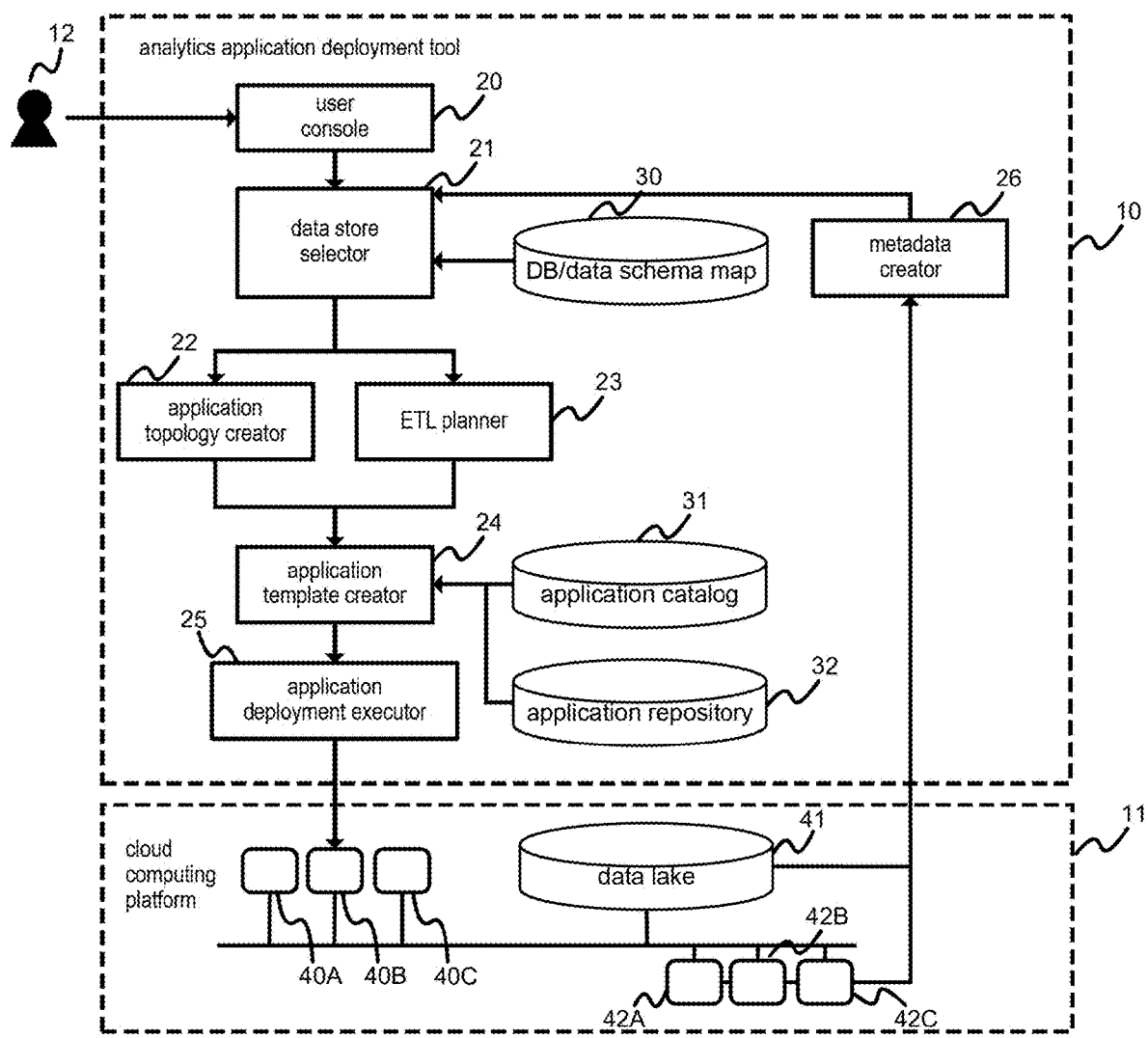
FIG. 2 illustrates a system in accordance with an example implementation.

FIG. 2 illustrates a system in accordance with an example implementation. The system includes an analytics application deployment tool 10, which can involve a user console 20, a data store selector 21, an application topology creator 22, an ETL planner 23, an application template creator 24, an application deployment executor 25 and a metadata creator 26. The analytics application deployment tool 10 also contains some data stores, like a DB/data schema map table 30, an application catalog 31 and an application repository 32. The cloud computing platform 11 is platform where an application will be deployed. The cloud computing platform 11 contains some virtual resources 40A, 40B and 40C connected into network each other, a data lake 41 and other data sources 42A, 42B and 42C. Thus, data lake 41 and other data sources 42A, 42B and 42C are in the cloud computing platform 11 because data should be easily accessible to application components, but data sources may also be outside of the cloud computing platform 11 in some cases, as with implementations involving the Internet of Things (IoT) and hybrid cloud platforms. The user 12 is the user for the analytics application deployment tool 11. In example implementations, such users can be data scientists.

Figure 3:
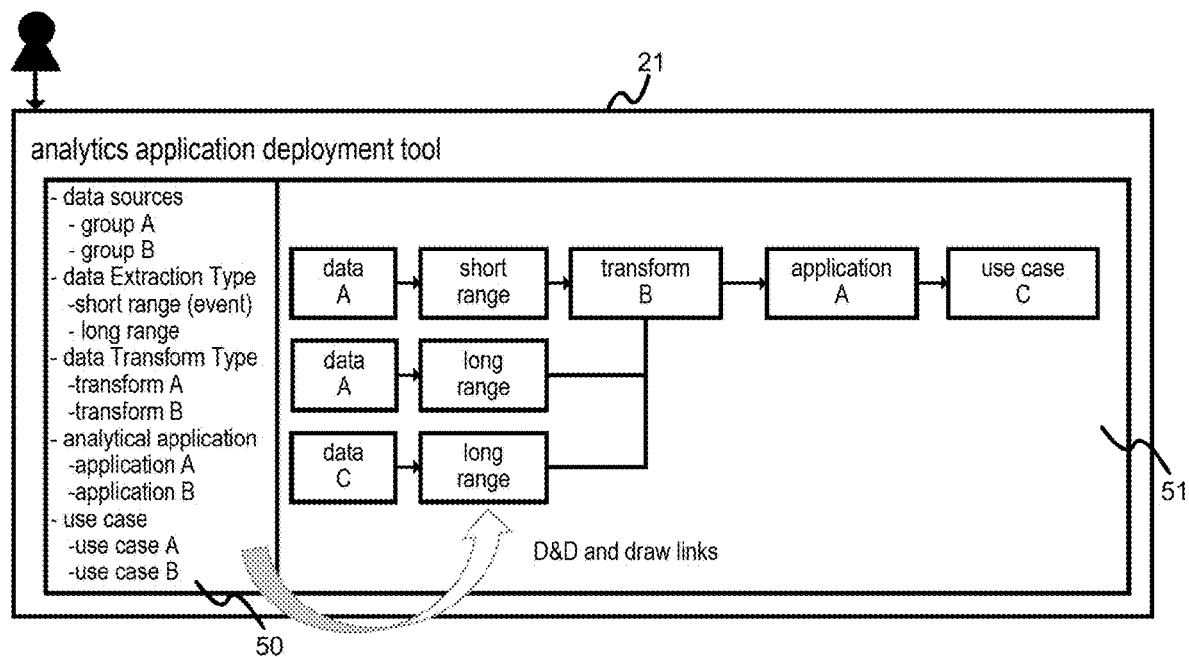
FIG. 3 shows an example of a Graphics User Interface (GUI) for an analytics application deployment tool, in accordance with an example implementation.

In FIG. 2, the user console 20 is the console which user operate to create an analytics blueprint, which is provided in further detail with respect to FIG. 3. The data store selector 21 selects adequate DBs and creates data schemas fitted to selected DBs by using DB/data schema map 30 and metadata created by the metadata creator 26. The data store selector 21 and DB/data schema map 30 are explained in further detail with respect to FIG. 5, and the metadata creator 26 explained in further detail in FIG. 4. The application topology creator 22 creates the logical topology of application components based on the user analytics plan created in user console 20 and DBs selected by the data store selector 21. The ETL planner 23 creates the plan to extract, transform and load data from source data to DBs created by the application deployment executor 25. The data extraction and transformation is based on the user analytics plan created in user console 20. The application template creator 24 creates an implementation of the plan created by the application topology creator 22 and the ETL planner 23, which can be in the form of DB executable code such as Chef Recipe or Ansible Playbook. The application template creator 24 utilizes the application catalog 31 and the application repository 32, wherein the application deployment executor 25 executes deployment of application components and data loading. The application deployment executor 25 can be executed similarly as Chef or Ansible. The data lake 41 is a data store where various data is stored. Generally, the data lake 41 is object storage, and depending on the desired implementation, the data lake 41 can be implemented as object storage.

Figure 9:
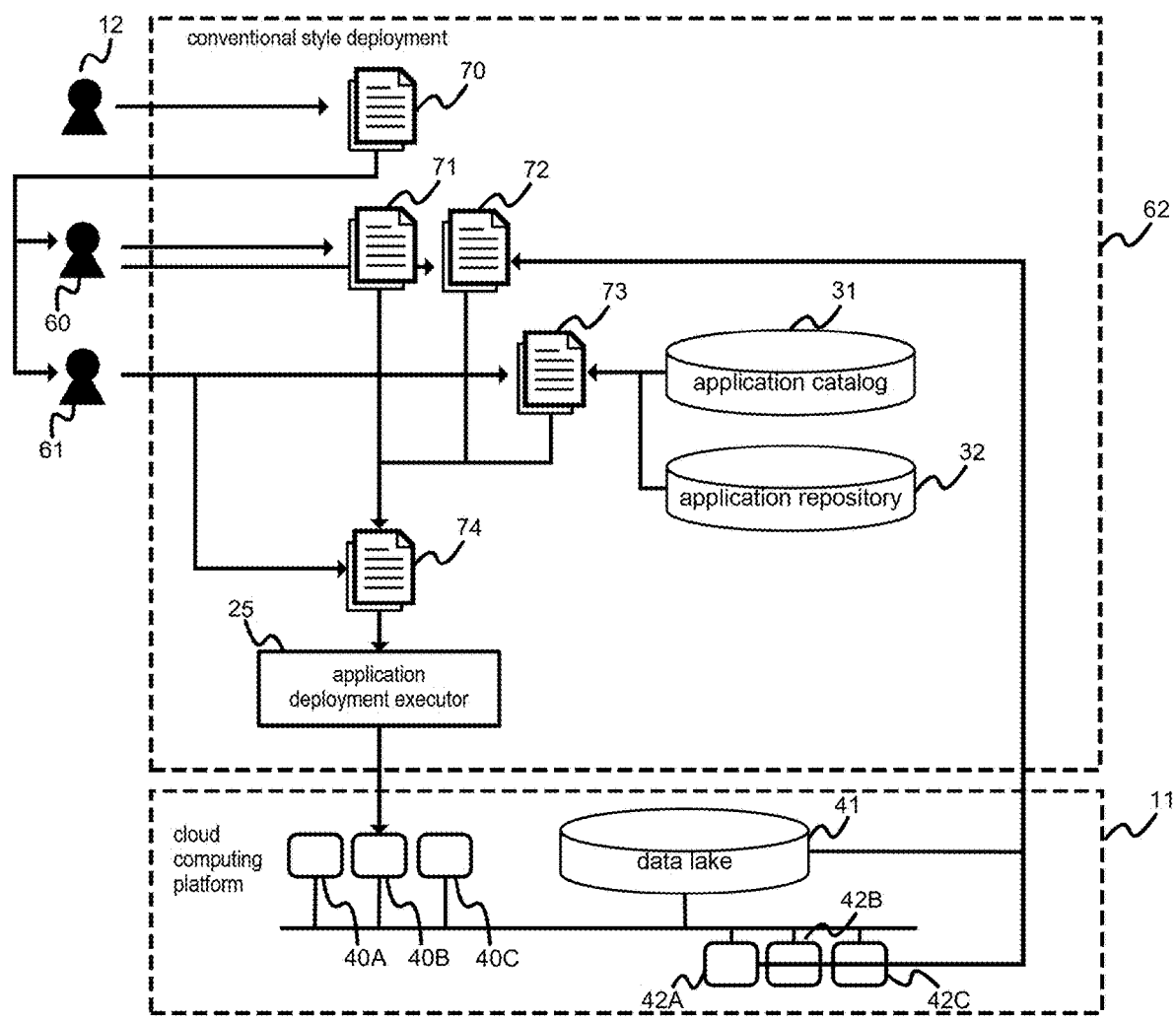
FIG. 9 illustrates an existing procedure of deployment in the related art.

In the example of FIG. 2, the system can be implemented as a single terminal for a data scientist, so that each data scientist can utilize their own terminal to execute the functionalities as illustrated in FIG. 2. Through such implementations, the terminals of the application engineer and the data engineer and the corresponding specialized software packages as illustrated in FIG. 9 can be eliminated, thereby reducing the number of hardware terminals and software packages for facilitating the functionality as illustrated in FIG. 2.

FIG. 3 shows an example of a Graphics User Interface (GUI) for an analytics application deployment tool 11, in accordance with an example implementation. This is implemented as the user console 21 in FIG. 1. The GUI 21 has two panes. The left pane 50 has items which include components of data analytics that the users can select, drag and drop according to their desired implementation. Such items can contain data sources, data extraction type, data transform type, application type, and use case type. Data sources menu has data sources which are analyzed in data analytics application. In the example implementation of FIG. 3, the menu shows data sources as file groups for ease of understanding, but can also be in other forms according to the desired implementations. The GUI 21 is able to show not only file groups but individual files as well, depending on the desired implementation.

The data extraction type indicates what range of data users want. For example, if user selects a short range of data, example implementations of the system can analyze the most recent data as an event or stream. On the other hand, if the user selects a long range of data, example implementations facilitate batch analytics with the long range data.

The data transformation type indicates the kinds of algorithms that can be applied to selected data. If the user selects a sampling transformation, the user can handle the data frequency. In the application type, user can select the desired application. The use case indicates the different types of use cases that the user wishes to do on the application, such as visualization, creation of graph, creation of list and the detection of event.

On the right pane 51, the blueprint of the logical data procedure flow can be defined. Each of items can be dragged and dropped from the left pane 50. The blueprint on the right pane 51 instructs the system as to what logical topology of the application that is to be created. In the example of FIG. 3, user wants to conduct analytics for the use case C on application A with data A, duplicated data A and data C, wherein each of the data is extracting short, long and long range data and transformed with transform B, NULL and NULL respectively. Here, NULL indicates that no transformation is applied.

FIG. 4 illustrates an example of filtering from metadata creator 26, in accordance with an example implementation. The metadata creator 26 creates metadata from data obtained from data lake 41 and other data sources 42A, 42B and 42C. The reason of creating the metadata is to make the data store selector 21 understand data characteristics easily. The metadata, which means the data characteristics, can help the data store selector 21 select data store and create data schemas. In the example implementation, the metadata creator 26 creates metadata based on the data shown at T34. The metadata creator 26 generates a JavaScript Object Notation (JSON) or similar document from all groups of inputs. T34 shows that group A involves source files that are Comma Separated Values (CSV) files. Similarly, group B, group C and group D involve files of JSON, Extensible Markup Language (XML) and text files. JSON and similar types of documents from all groups contain keys created by the filter algorithm and values extracted from source files. Note that all JSON and similar types of documents include not only keys and values from source files, but the number of rows and columns of data as well. Such implementations can facilitate the data store selector 21 to select DBs.

FIG. 5 illustrates the example of a table T30 representing the DB/data schema map 30 shown in FIG. 2, in accordance with an example implementation. The table T30 is used by the data store selector 21 for selecting adequate DBs and creating its data schemas. T30 illustrates example types such as the use case, the metadata of the source data, the data extraction type, the DB and the data schema. The use case shows what user wants to do on analytics application. This column contains items as same in the use case on GUI 21. The metadata of source data is the list of metadata created by the metadata creator 26. The data extraction type is the same as the data extraction type in GUI 21. The DB contains DB items selected according to the use case, the metadata of source data and the data extraction type. The data schema contains schema items selected according to the use case, the metadata of source data and the data extraction type. For instance, when a visualization involving a graph for short range data is desired, the data store selector 21 selects "key-value in-memory DB" as DB and creates a data schema followed by the data schema column.

FIG. 6 shows an example of application catalog 31, in accordance with an example implementation. The example table T31 of application catalog 31 illustrates columns for application name and application template. The application name is the identifier of application template. The application template is an implementation of application template. In this example, the application template in T31 is based on the Docker compose file, with some parts extended, however other implementations are also possible and the template can be constructed in accordance with the desired implementation. The template has DB template which can assign any DBs within its template.

FIG. 7 illustrates an example of application repository 32, in accordance with an example implementation. The example table T32 of application repository 32 illustrates columns for application name, application configuration file and code. The application name is the identifier of application repository. The application configuration file indicates the name, the version and supporting DBs. The application topology creator 22 and the application template creator 24 use such a configuration file to validate DBs selected by the data store selector 21. The code can contain application code, depending on the desired implementation.

Figure 8:
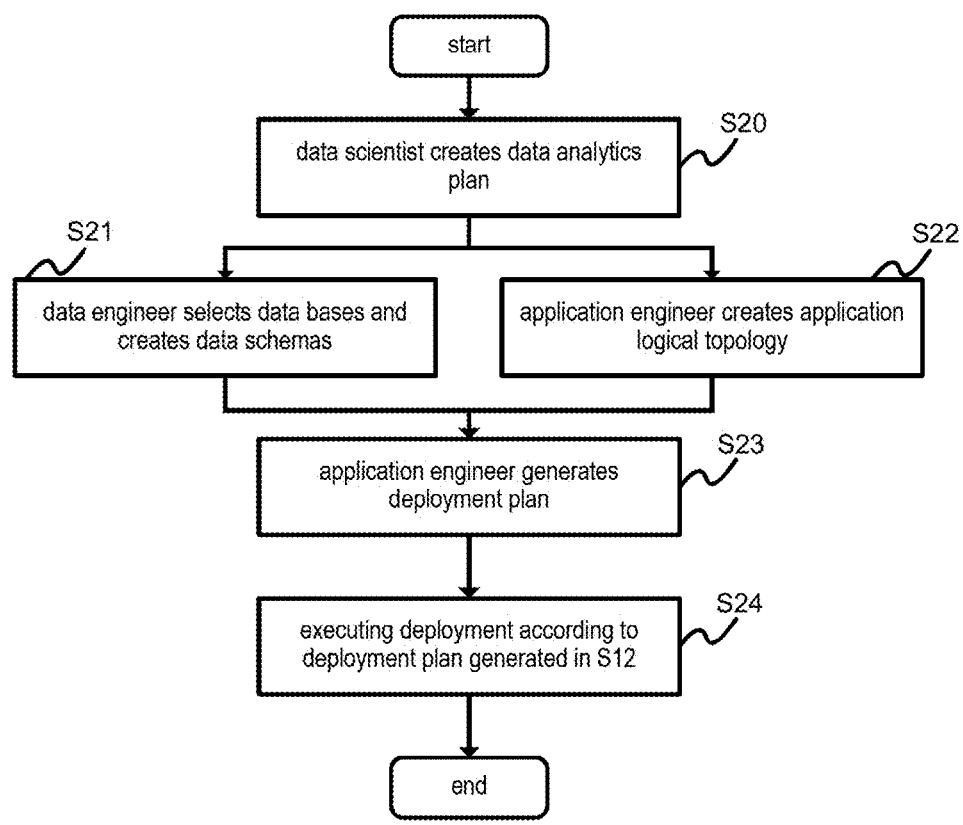
FIG. 8 illustrates an example flow in the related art.

FIG. 8 illustrates an example flow in the related art. FIG. 9 illustrates an existing procedure of deployment 62 in the related art. In the related art implementations, the data engineer 60 utilizes a terminal having a software package configured to manage data, select a database and create a database schema. Application engineer 61 utilizes a terminal having a software package configured to create an application. Through the related art flow, the data analytics plan 70 is the document created at S20 in FIG. 8. Data ETL plan 71 and Data schema plan 72 is created through the terminal of the data engineer 60, each of which is the document of the way of ETL and the database schema respectively. These documents are created at S21 in FIG. 8. Application logical topology 72 is a document created through the terminal of the application engineer 61 at S22 in FIG. 8. Application engineer 61 utilizes a special terminal to create an application deployment plan 74 by using the documents 71, 72 and 73. Lastly, application deployment executor 25 follows the document 74 to deploy the application.

In contrast to the related art implementations, example implementations described herein can select adequate DBs and its data schema, create logical topology of application components including DBs selected by the data store selector 21, load data from source data store to DBs formatted by created data schema and deploy the application components automatically to cloud computing platform 11. Therefore, the user does not have to consider the types of DBs utilized, thereby allowing the user to deploy analytics application at a lower cost than the related art implementation.

Example implementations improve on the related art implementations through eliminating the need for special software package deployments and terminals of the application engineer 61 and data engineer 60. Through such implementations, fewer specially configured apparatuses are needed to generate a DB schema and application logical topology to generate a deployment plan. Instead, such implementations can be implemented as a general purpose software package deployed on the terminal of the data scientist, thereby reducing the number of terminals and special deployment packages needed to generate and facilitate the deployment plan.

Figure 10:
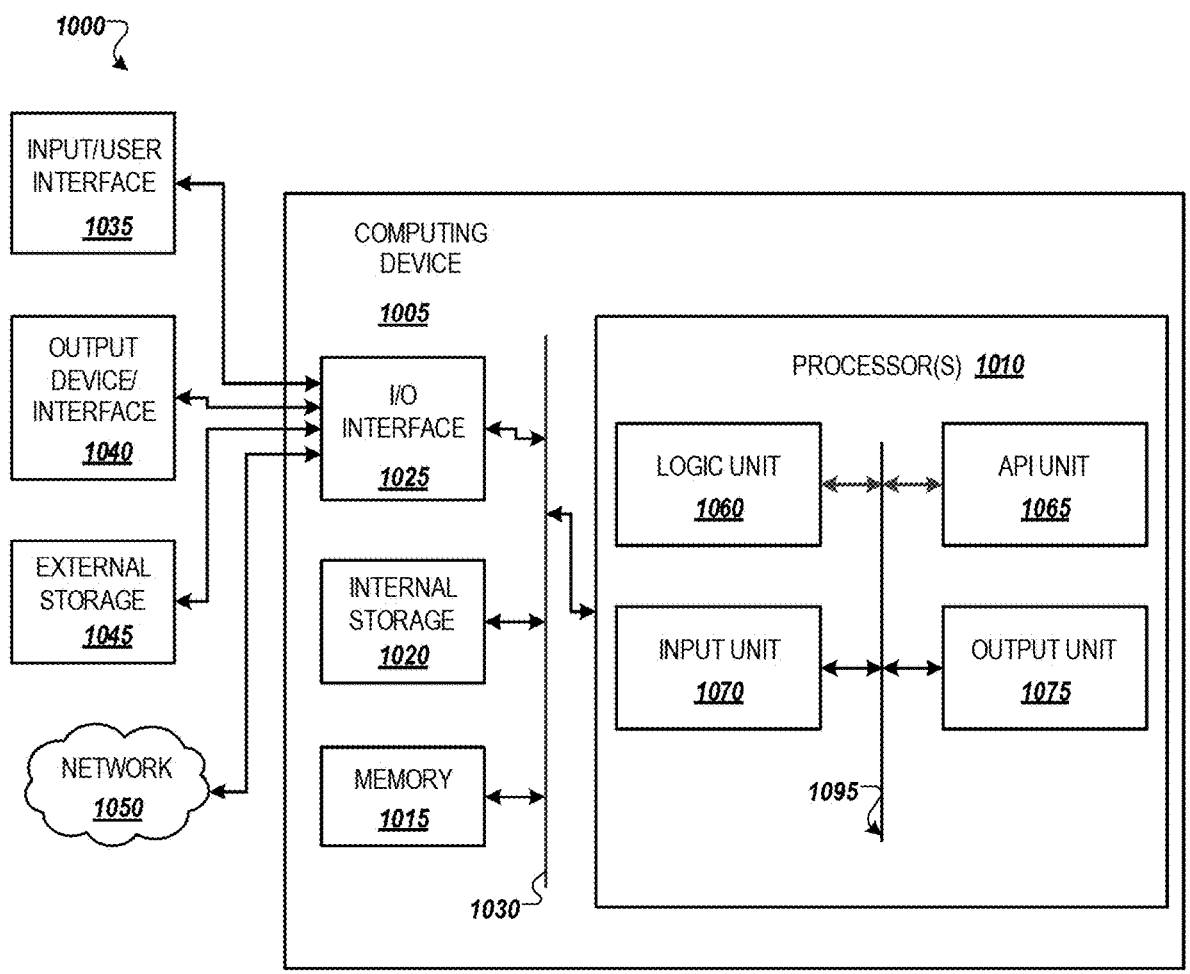
FIG. 10 illustrates an example computing environment with an example computer device suitable for use in some example implementations.

FIG. 10 illustrates an example computing environment with an example computer device suitable for use in some example implementations, such as a terminal configured to execute the analytics application deployment tool as illustrated in FIG. 2. In example implementations, the computer device 1005 is a single terminal for each data scientist, which eliminates the need for terminals for application engineers and data engineers as illustrated in FIG. 9. As such, only data scientists have their own terminals for effecting the functionality as described in the present disclosure.

Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computer device 1005.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

Processor(s) 1010 can be configured to execute the flow diagrams as illustrated in FIGS. 1(*a*) to 1(*e*) to facilitate the functionality of the system as illustrated in FIG. 2 and the functionality of the GUI as illustrated in FIG. 3. Memory 1015 can be configured to store the information as illustrated in FIGS. 4 to 7 as well as the databases as illustrated in FIG. 2.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for analytics deployment, comprising:
   generating one or more data schemas for a data analytics plan and a selection of one or more databases by:
   extracting from the data analytics plan, a use case, a metadata of source data, and a data extraction type,
   referring to data schema mapping information that maps the use case, the metadata of source data, and the data extraction type corresponding to one or more databases and the one or more data schemas,
   selecting the corresponding one or more databases from the reference to the data schema mapping information as the one or more databases, and
   generating the one or more data schemas from the referring to the data schema mapping information;
   generating a logical topology of application components and an Extract, Transfer, Load (ETL) plan;
   generating a deployment plan from an application template generated based on the generated logical topology of application components and the generated ETL plan, the deployment plan comprising executable code for a deployment engine; and
   executing the executable code on the deployment engine to deploy the data analytics plan on a cloud computing platform.

2. The method of claim 1, wherein the generating a logical topology of application components and an Extract, Transfer, Load (ETL) plan comprises:
   processing, from the data analytics plan and the selection of the one or more databases, the connections between the application components;
   generating the logical topology of the application components from connections between the application components; and
   generating the ETL plan from transforms defined in the data analytics plan between data sources defined in the data analytics plan and the one or more databases.

3. The method of claim 1, wherein the generating a deployment plan from the logical topology of application components and the ETL plan, the deployment plan comprising executable code for a deployment engine, comprises:
   determining, from application catalog information, an application template for each of the application components, the application template comprising a database template configured to assign a database;
   determining from an application repository information, a corresponding application configuration file for each of the application components, each of the corresponding application configuration files comprising executable application code and metadata indicative of valid databases for the each of the application components; and
   generating the deployment plan from the corresponding application configuration file for each of the application components and the application template for each of the application components.

4. The method of claim 1, wherein the executing the executable code on the deployment engine to deploy the data analytics plan on the cloud computing platform comprises:
   deploying application components according to the deployment plan;
   generating connections between the application components according to the deployment plan; and
   loading data to the selected one or more databases according to the generated one or more data schemas.

5. The method of claim 1, wherein the method for analytics deployment is conducted through a single terminal.

6. A non-transitory computer readable medium, storing instructions for analytics deployment, the instructions comprising:
   generating one or more data schemas for a data analytics plan and a selection of one or more databases by:
   extracting from the data analytics plan, a use case, a metadata of source data, and a data extraction type,
   referring to data schema mapping information that maps the use case, the metadata of source data, and the data extraction type to corresponding one or more databases and the one or more data schemas,
   selecting the corresponding one or more databases from the reference to the data schema mapping information as the one or more databases, and
   generating the one or more data schemas from the referring to the data schema mapping information;

generating a logical topology of application components and an Extract, Transfer, Load (ETL) plan;
generating a deployment plan from an application template generated based on the generated logical topology of application components and the generated ETL plan, the deployment plan comprising executable code for a deployment engine; and
executing the executable code on the deployment engine to deploy the data analytics plan on a cloud computing platform.

7. The non-transitory computer readable medium of claim 6, wherein the generating a logical topology of application components and an Extract, Transfer, Load (ETL) plan comprises:
processing, from the data analytics plan and the selection of the one or more databases, the connections between the application components;
generating the logical topology of the application components from connections between the application components; and
generating the ETL plan from transforms defined in the data analytics plan between data sources defined in the data analytics plan and the one or more databases.

8. The non-transitory computer readable medium of claim 6, wherein the generating a deployment plan from the logical topology of application components and the ETL plan, the deployment plan comprising executable code for a deployment engine, comprises:
determining, from application catalog information, an application template for each of the application components, the application template comprising a database template configured to assign a database;
determining from an application repository information, a corresponding application configuration file for each of the application components, each of the corresponding application configuration files comprising executable application code and metadata indicative of valid databases for the each of the application components;
generating the deployment plan from the corresponding application configuration file for each of the application components and the application template for each of the application components.

9. The non-transitory computer readable medium of claim 6, wherein the executing the executable code on the deployment engine to deploy the data analytics plan on the cloud computing platform comprises:
deploying application components according to the deployment plan;
generating connections between the application components according to the deployment plan; and
loading data to the selected one or more databases according to the generated one or more data schemas.

10. The non-transitory computer readable medium of claim 6, wherein the instructions for analytics deployment is executed through a single terminal.

11. A system configured to manage analytics deployment for a cloud computing platform, the system comprising:
a memory, configured to manage a plurality of databases, and
a processor, configured to:
generate one or more data schemas for a data analytics plan and a selection of one or more databases from the plurality of databases by:
extracting from the data analytics plan, a use case, a metadata of source data, and a data extraction type,
referring to data schema mapping information that maps the use case, the metadata of source data, and the data extraction type to corresponding one or more databases and the one or more data schemas,
selecting the corresponding one or more databases from the reference to the data schema mapping information as the one or more databases, and
generating the one or more data schemas from the referring to the data schema mapping information;
generate a logical topology of application components and an Extract, Transfer, Load (ETL) plan;
generate a deployment plan from an application template generated based on the generated logical topology of application components and the generated ETL plan, the deployment plan comprising executable code for a deployment engine; and
execute the executable code on the deployment engine to deploy the data analytics plan on the cloud computing platform.

12. The system of claim 11, wherein the generating a logical topology of application components and an Extract, Transfer, Load (ETL) plan comprises:
processing, from the data analytics plan and the selection of the one or more databases, the connections between the application components;
generating the logical topology of the application components from connections between the application components; and
generating the ETL plan from transforms defined in the data analytics plan between data sources defined in the data analytics plan and the one or more databases.

13. The system of claim 11, wherein the processor is configured to generate a deployment plan from the logical topology of application components and the ETL plan, the deployment plan comprising executable code for a deployment engine, by:
determining, from application catalog information, an application template for each of the application components, the application template comprising a database template configured to assign a database;
determining from an application repository information, a corresponding application configuration file for each of the application components, each of the corresponding application configuration files comprising executable application code and metadata indicative of valid databases for the each of the application components;
generating the deployment plan from the corresponding application configuration file for each of the application components and the application template for each of the application components.

14. The system of claim 11, wherein the processor is configured to execute the executable code on the deployment engine to deploy the data analytics plan on the cloud computing platform by:
deploying application components according to the deployment plan;
generating connections between the application components according to the deployment plan; and
loading data to the selected one or more databases according to the generated one or more data schemas.

15. The system of claim 11, wherein the system is a single terminal.

* * * * *